United States Patent [19]

Sakita et al.

[11] 3,914,443
[45] Oct. 21, 1975

[54] PROCESS FOR PREPARING MEAT-LIKE FOODSTUFFS

[75] Inventors: Takashi Sakita; Gyota Taguchi, both of Yokohama, Japan

[73] Assignee: The Nisshin Oil Mills, Ltd., Japan

[22] Filed: June 24, 1974

[21] Appl. No.: 482,272

Related U.S. Application Data

[63] Continuation of Ser. No. 265,450, June 23, 1972, abandoned.

[30] Foreign Application Priority Data

Feb. 1, 1972 Japan.............................. 47-10945

[52] U.S. Cl................. 426/274; 426/574; 426/802
[51] Int. Cl.²............................................. A23J 3/00
[58] Field of Search........... 426/274, 350, 364, 574, 426/802

[56] References Cited
UNITED STATES PATENTS

| | | | |
|---|---|---|---|
| 3,093,483 | 6/1963 | Ishler et al. | 426/274 X |
| 3,498,793 | 3/1970 | Page et al. | 426/274 |
| 3,644,121 | 2/1972 | Boyer et al. | 426/274 |

*Primary Examiner*—James R. Hoffman
*Attorney, Agent, or Firm*—McGlew & Tuttle

[57] ABSTRACT

Heat-denatured soybean protein capable of gel forming, together with gelatin, is used as a binder for edible protein fibers to prepare meatlike foodstuffs which closely resemble natural meats as to texture, chewiness and appearance.

7 Claims, No Drawings

PROCESS FOR PREPARING MEAT-LIKE FOODSTUFFS

This is a continuation of application Ser. No. 265,450, filed June 23, 1972, now abandoned.

BACKGROUND OF THE INVENTION

The present invention relates to a process for the preparation of meat-like foodstuffs with excellent appearance, texture and chewiness.

The prior art for spinning protein materials to prepare protein fibers arose from the concept of attempting to have the resulting meat-like foodstuffs approximate the appearance and chewiness of the natural meat, and it is a known fact that meat-like food stuffs made of fibrous proteins have by far superior appearance and chewiness when compared with those of the processed foodstuffs made of a textured protein. However, even those processed foodstuffs from the fibrous proteins in which heat-coagulable proteins represented by egg albumin are usually employed as binders for fibers, are considerably apart in their characteristics from natural meat.

An object of the present invention is to provide a binder suitable to be used in preparing meat-like foodstuffs from edible protein fibers.

Another object of the present invention is to provide a process for the preparation, from edible protein fibers, of meat-like foodstuffs closely resembling natural meats as to texture, chewiness and appearance.

SUMMARY OF THE INVENTION

The present invention relates to a process for preparing meat-like foodstuffs having excellent appearance, texture and chewiness by impregnating edible protein fibers or tows thereof with a composition containing a binder and heating the impregnated fibers or tows to solidify same, characterized in that the binder consists essentially of a heat-denatured soybean protein capable of gel formation and gelatin, said binder being used in an amount sufficient to bind the fibers after heating.

According to the present invention, the heat-denatured soybean proteins used for binding protein fibers are an excellent binder which forms, like egg albumin does, a heat-coagulable gel.

But, gel itself is quite different in chewiness from that of the egg albumin, and furthermore the gelatin used in combination with the said soybean protein binder, is another binder which is thermoplastic and has quite different coagulability which coagulates at a temperature below 30°C.

DETAILED DESCRIPTION

The detailed description of the invention discloses the following characteristics in which two binders with entirely different coagulability are used in combination. There is, needless to say, a necessity to bind the protein fibers together sufficiently so as to maintain the fixed shape of meat-like foodstuffs for either case where the meat-like foodstuffs processed finally with fats or oils, and flavoring agents and others are eaten as they are kept cold or after being heated. The heat-denatured soybean protein is capable of attaining such effects due to its superior binding property, and furthermore gelatin also contributes to binding below the normal temperature.

According to the present invention, another characteristics effects obtained by the joint use of gelatin, are that the gelatin to exerts an excellent influence so as to have a meat-product with the glaze and texture of the meat-like foodstuffs approximating the appearance and chewiness of natural meat. Furthermore, when the meat-like food-stuffs of the present invention are eaten at normal temperature, the gelatin melts out in small doses in the mouth and therefore can exert the same effect as meat juice which oozes out when chewing the natural meat.

As stated above, the excellent characteristics of the meat-like foodstuffs of the present invention can be attained with synergistic effects by the joint use of gelatin and the heat-denatured soybean protein which is capable of gel forming.

The edible protein fibers used in the present invention may be prepared according to the method disclosed in U.S. Pat. No. 2,682,466 to Robert A. Boyer or other methods similar thereto, and the starting materials are animal or vegetable protein, such as a soy-bean protein, a peanut protein, casein and the like. The usual method for the preparation of protein fibers comprises re-dissolving a protein with water and an alkali said protein condensate being obtained by extracting and isolating proteins from protein materials to produce a spinning dope having a protein concentration of usually 10–30% and a pH of 9–13, and forcing said spinning dope through fine holes into a coagulating bath composed of acids and salts to form fibers and if desired, stretching, decoloring, deodorizing and thereafter neutralizing said fibers to a pH of 4–7.

The heat-denatured soybean protein capable of gel forming to be used in the present invention means a concentrated or isolated protein having a pH of 6–7.5 or a dried materials derived therefrom prepared from soybean materials according to the conventional method wherein a heat-denaturing is effected at a temperature above about 80°C for a period of time over 2 minutes during at least one of the following steps or procedures:

1. desolventizing step after defatting of the soybean materials,
2. a step of extracting a protein from the defatted soybean by water or an alkali,
3. an protein solution after insoluble impurities being removed from the extract obtained by the said step (2) and preferably,
4. a step of re-dissolving with an alkali a protein curd obtained by subjecting the said protein solution to isoelectric point precipitation.

In respect of the amount of the binder used in the present invention (hereinafter all being indicated as solids), the heat-denatured soybean protein may range from 20 to 90 parts by weight based on 100 parts by weight of the protein fiber solids, and in the case of not more than 20 parts the binding is insufficient, while in the case of exceeding 90 parts the chewiness becomes unsatisfactory. The gelatin may be comprised between 5 parts and 30 parts by weight based on 100 parts of the protein fiber solids. In the case of not more than 5 parts the appearance becomes inferior and the chewiness is not so much satisfactory as the meat juice of the natural meat. On the other hand the amount above 30 parts is improper because when being processed into the meat-like food-stuffs the gelatin bleeds copiously at the surface thereof.

The present invention is illustrated by the following examples.

EXAMPLE 1

To prepare a spinning dope having a protein concentration of 24.2% by weight and a pH of 10 water and sodium hydroxide were added to a milk casein. This spinning dope, after defoaming and filteration, was forced through the fine holes having a diameter of 0.06mm into a coagulating bath containing 3% by weight hydrochloric acid and 10% by weight sodium chloride to form acid fibers having 0.8pH. A tow of edible protein fibers was prepared by neutralizing the said acid fibers to a pH of 5 with calcium hydroxide.

On the other hand, the hexane-extracted soybean flakes, after a desolvent treatment by blowing to the same a live steam for three minutes, are pulverized to form a heat-denatured, defatted soybean flour having a soluble nitrogen content of 56.2% by weight.

100 parts by weight of the tow of protein fibers mentioned above were impregnated with a composition containing materials in the types and amounts as indicated below, including the said heat-denatured defatted soybean flour and gelatin, the binders of the present invention, and then the impregnated tow was heated directly with steam for 30 minutes, solidified and cooled. The meat-like food-stuffs thus obtained have superior glaze and texture and a satisfactory chewiness.

|  | Parts by weight |
|---|---|
| Heat-denatured, defatted soybean flour | 14 |
| Powdered gelatin | 6 |
| Beef flavor (in paste) | 25 |
| Sodium glutamate | 1 |
| Sodium chloride | 3 |
| Spice and herb (onion, garlic, laurel) | 0.8 |
| Red dye (2% solution) | 0.2 |
| Hydrogenated soybean oil (m.p. 36°C) | 20 |
| Water | 40 |

EXAMPLE 2

To a soybean protein curd produced by extracting and isolating proteins from a low de-natured, de-fatted soybean according to the conventional process, was added water and sodium hydroxide to obtain a spinning dope having a protein concentration of 15.5% by weight and a pH of 12.5. This spinning dope, after defoaming and filtration, was forced through fine holes having a diameter of 0.08mm into a coagulating bath containing 3% by weight acetic acid, 10% by weight sodium chloride and 2% by weight sodium sulfate to obtain acid fibers having a pH of 3.2. A tow of edible protein fibers was prepared by neutralizing the said acid fibers to a pH of 6.5 with sodium hydrogen carbonate and dehydrating the same to water content of 70.6%.

On the other hand isolated protein flour having a soluble nitrogen content of 93% by weight was prepared by adding water and sodium hydroxide to the above-mentioned soybean protein curd, heat-denaturing the resulting solution having an 11.5% protein content and a pH of 7 at 95°C for 10 minutes and thereafter subjecting the same to spray-drying.

A binder of 20 parts by weight of the above heat-denatured, isolated protein flour and 8 parts by weight of gelatin as well as additives such as oils or fats, and flavoring agents and the like as in Example 1 were added to 100 parts by weight of the tow of protein fibers mentioned above, and a procedure similar to Example 1 was followed. The thus obtained meat-like foodstuffs were found to possess satisfactory characteristics very closely approximating the appearance and chewiness of the natural meats.

We claim:

1. A process for preparing meat-like foodstuffs by impregnating edible protein fibers with a composition containing a binder and heating the impregnated fibers to solidify said binder, wherein the binder consists essentially of a heat-denatured soybean protein capable of gel formation and gelatin, said binder being used in an amount sufficient to bind the fibers after heating, and wherein the heat-denatured soybean protein capable of gel forming and gelatin are present in the binder from 20 to 90 parts by weight and from 5 to 30 parts by weight, respectively, based on 100 parts by weight of the protein fiber solids.

2. A process of claim 1, wherein the edible protein fibers are spun soybean protein fibers.

3. A process according to claim 1, wherein the heat-denatured soybean protein capable of gel forming comprises a concentrated protein solution having a pH of 6 – 7.5.

4. A process according to claim 1, wherein the heat-denatured soybean protein capable of gel forming comprises a dried material derived from soybean material according to a method wherein the heat-denaturing is effected by heating said material to a temperature above about 80°C for a period of time over 2 minutes including the steps of defatting said soybean material and removing solvent after defatting of the said soybean material.

5. A process according to claim 4, which includes the step of extracting a mixture containing protein from the defatted soybean material by water or an alkali.

6. A process according to claim 5, which includes the step of removing protein containing aqueous phase protein solution from the said mixture containing protein from the defatted soybean material.

7. A process according to claim 6, which includes the step of subjecting the said protein solution to isoelectric point precipitation, obtaining protein cured therefrom and redissolving said protein curd with alkali.

* * * * *